No. 719,407. PATENTED JAN. 27, 1903.
L. G. WOOLLEY.
COMBINED REGULATOR AND SAFETY MECHANISM FOR EXPLOSIVE ENGINES.
APPLICATION FILED FEB. 28, 1902.
NO MODEL. 3 SHEETS—SHEET 1.

WITNESSES:
Louis Dieterich
E. E. Overholt

INVENTOR
L. G. Woolley.
BY
Fred G. Dieterich & Co.
ATTORNEYS.

No. 719,407. PATENTED JAN. 27, 1903.
L. G. WOOLLEY.
COMBINED REGULATOR AND SAFETY MECHANISM FOR EXPLOSIVE ENGINES.
APPLICATION FILED FEB. 28, 1902.
NO MODEL. 3 SHEETS—SHEET 2.

WITNESSES: INVENTOR
Guy V. Worthington L. G. Woolley
E. E. Overholt BY
Fred G. Dieterich & Co.
ATTORNEYS

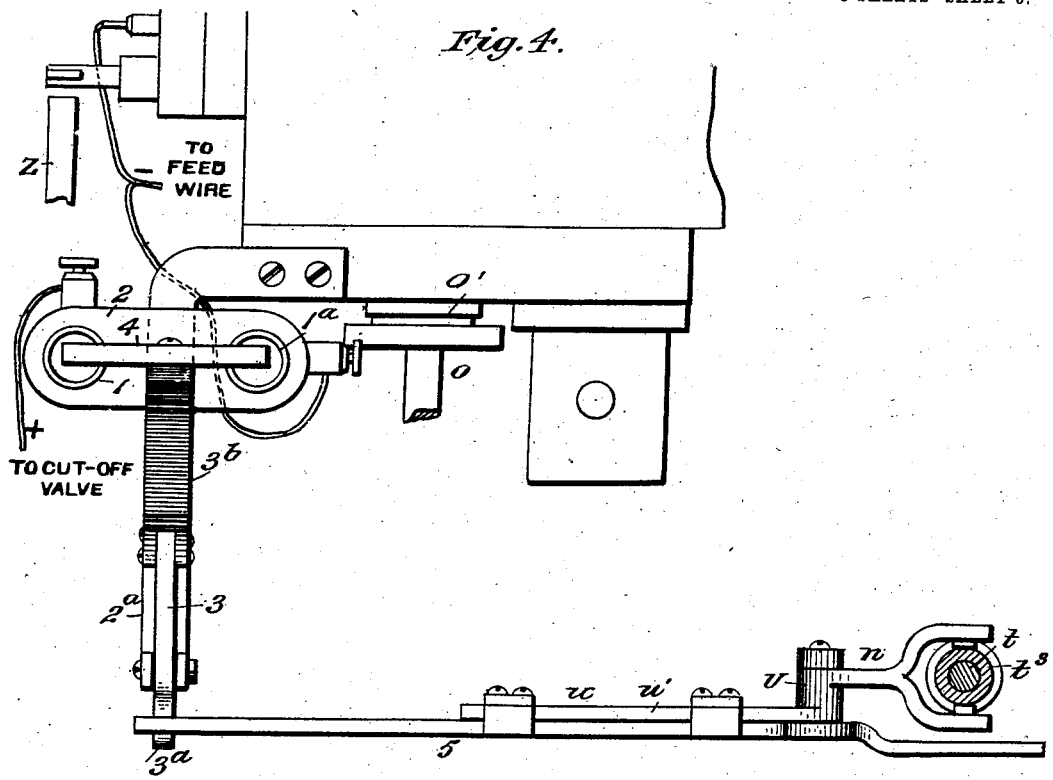
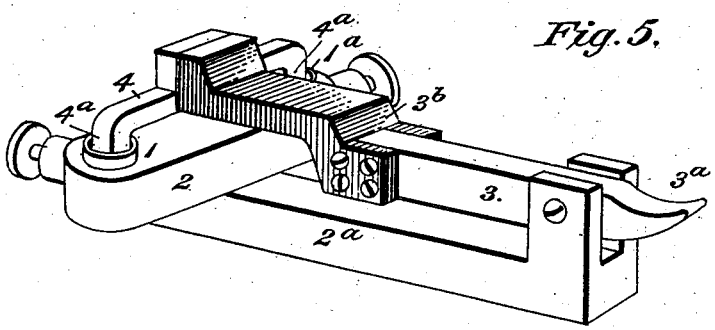
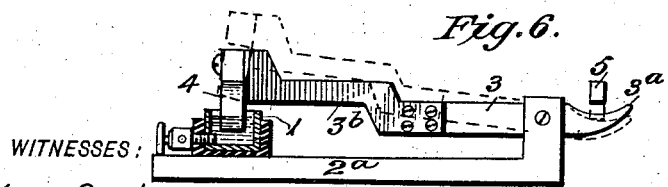

UNITED STATES PATENT OFFICE.

LEONIDAS G. WOOLLEY, OF KENTON, OHIO, ASSIGNOR TO THE MAGNETO ELECTRIC COMPANY, OF NEW YORK, N. Y.

COMBINED REGULATOR AND SAFETY MECHANISM FOR EXPLOSIVE-ENGINES.

SPECIFICATION forming part of Letters Patent No. 719,407, dated January 27, 1903.

Application filed February 28, 1902. Serial No. 96,192. (No model.)

*To all whom it may concern:*

Be it known that I, LEONIDAS G. WOOLLEY, residing at Kenton, in the county of Hardin and State of Ohio, have invented a new and Improved Combined Regulator and Safety Mechanism for Explosive-Engines, of which the following is a specification.

This invention, which in its generic nature relates to improvements to and is applicable for use on the ordinary types of explosive-engines, is more especially intended for that class of explosive-engines having electrical igniting means.

My invention in its generic nature comprehends means adapted to coöperate with the ordinary type of governor devices of explosive-engines having electric igniting devices adapted to automatically make and break the igniting electric circuit by the variable shifting of the governor devices from the normal or predetermined point at which said governor devices are intended to act to maintain the speed required for holding the current up to the maximum strength irrespective of the varying of the load on the engine.

In its more subordinate features my invention consists in certain details of construction and combination of parts, having especially for their purpose to provide for effectively and economically operating the complete generating plant in such manner that a practically uniform maximum current is maintained under all ordinary circumstances, and changes or variations of the load on the engine and in which the danger of the engine speeding beyond the predetermined point are overcome, and the burning out of lamps operated is reduced to the minimum, and danger of breakage or dismembering of parts of the engine and consequent disorganization of the lighting plant thereby overcome, all of which will hereinafter be more fully explained, and pointed out in the appended claims, reference being had to the accompanying drawings, in which—

Figure 1:
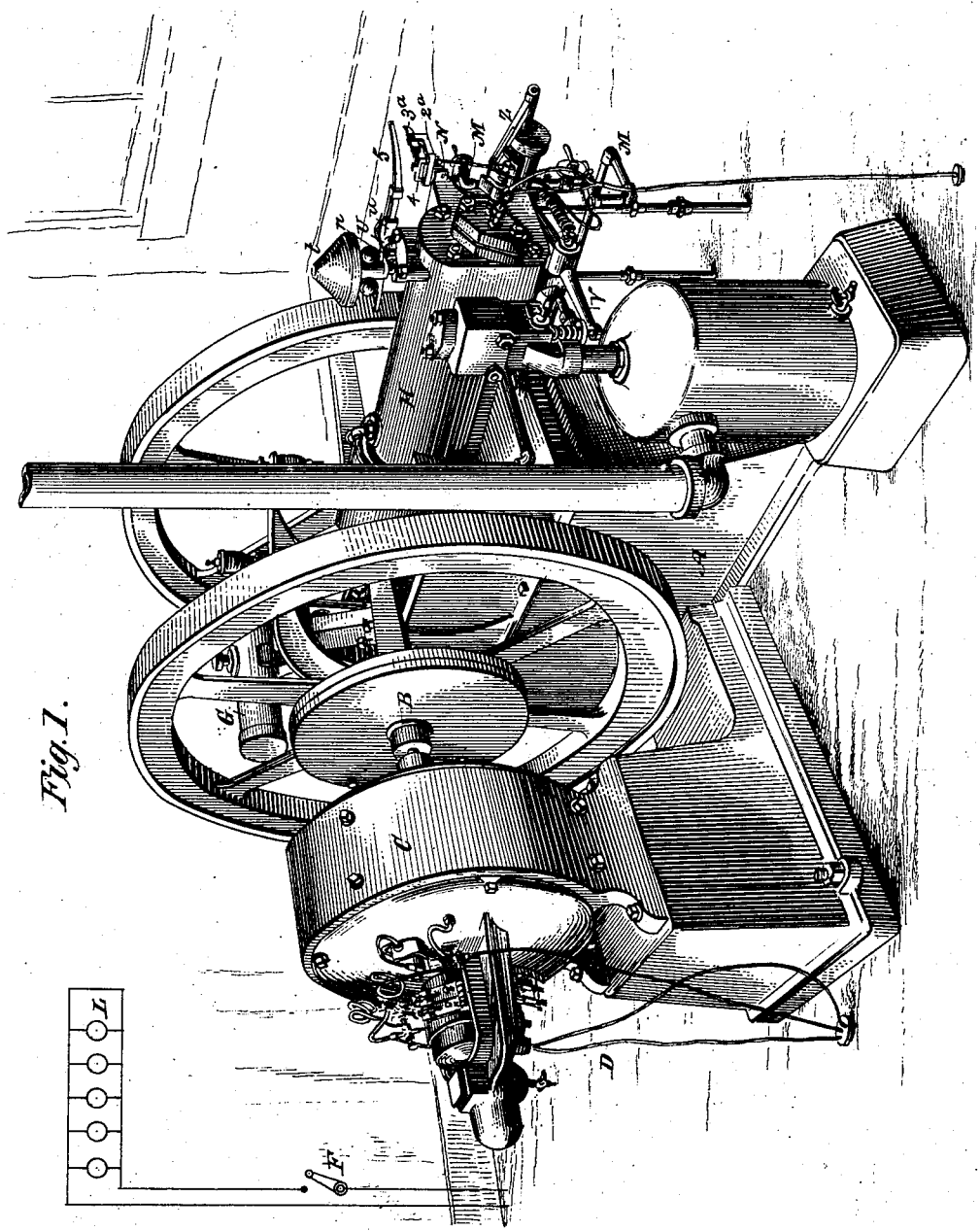
Figure 2:
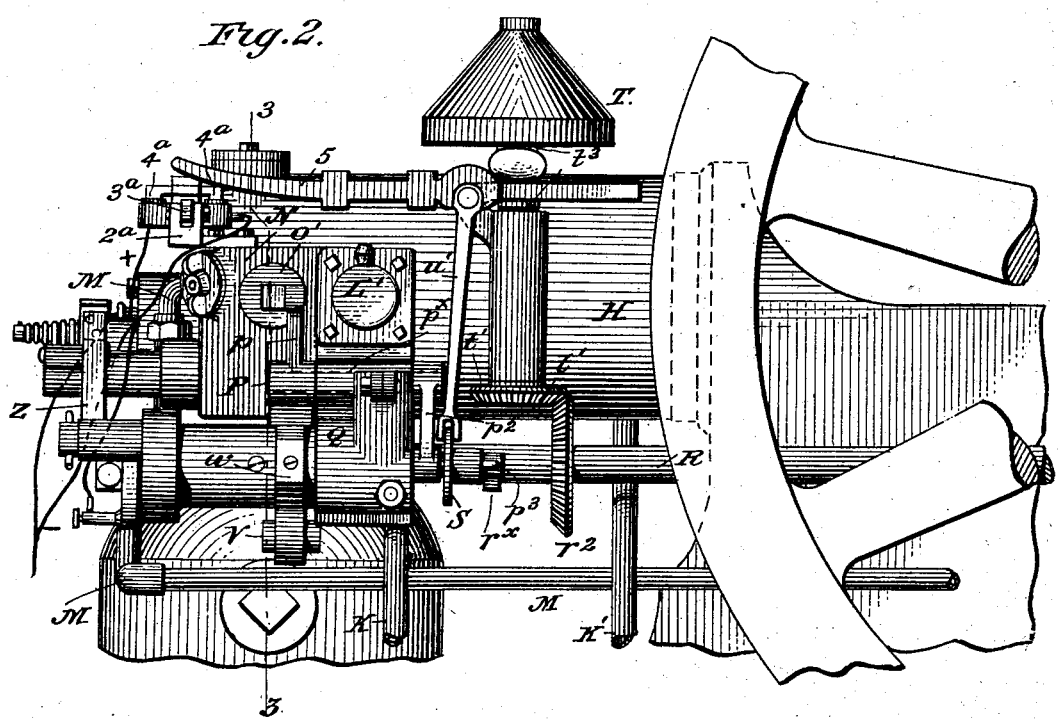
Figure 3:
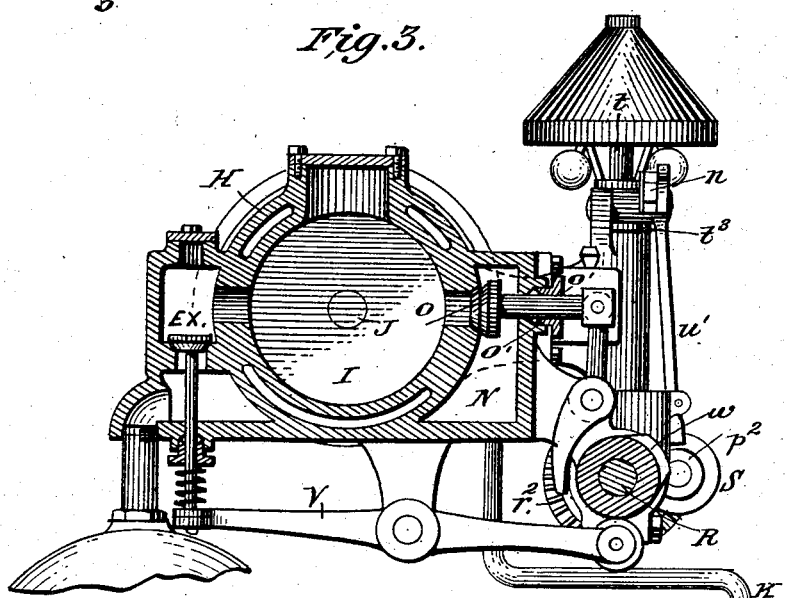

Figure 1 is a perspective view of an electric-light-current-generating means equipped with my improvements. Fig. 2 is a side elevation of the front end of the engine, the vibratory lever being shown disengaged from the circuit-controlling lever, hereinafter specifically referred to. Fig. 3 is a side view taken practically on the line 3 3 of Fig. 2. Fig. 4 is a diagrammatic plan view of the igniting-circuit devices and the safety cut-out mechanism and illustrates the electric-circuit wires in connection therewith. Fig. 5 is a detail perspective view of the governor-controlled contact making and breaking devices for the igniting-circuit. Fig. 6 is a side elevation thereof, the contact-lever being shown tilted to its circuit-breaking position in dotted lines.

In the practical application of my invention the essentials thereof are combined with an ordinary type of explosive-engine having electric igniting means—for example, of the type shown in Fig. 1, in which the correlative position of the engine, the dynamo, the lighting-circuit, and my improvements are shown to illustrate the complete lighting plant—and at this point I deem it proper to state that while my invention is applicable to electric-lighting plants in general it is more especially intended for small plants for individual residences, stores, factories, &c.

In the drawings, A designates the engine-base, B the crank-shaft, C a multipolar dynamo having a direct connection with one end of the shaft in any well-known manner, D D the current-take-off wires, L a series of lamps in the circuit, and F a switchboard, all of which may be of any well-known and approved construction and arrangement, as they *per se* form no essential part of my invention.

For convenient illustration I have shown a gasolene-tank G mounted upon the bed or frame of the machine, it being understood that in the practical arrangement said tank or holder is placed outside of the engine-room or other desired place.

The cylinder H, the piston I, the piston-rod J, coupled with the crank-shaft, the water intake and offtake pipes K K' to the water-jacket for the explosive-chamber, the air-intake L', and the gas or gasolene intake M, that discharges into the mixing-chamber N, all operate in the usual and well-known manner, and a detailed description thereof is therefore deemed unnecessary.

O designates the gasolene-controlling valve, the stem of which projects through the gland O' and connects with the crank member $p$ on one end of the rock-shaft P, mounted in suitable bearings $p^\times$, that form a part of the bracket Q, in which the outer end of the governor-operating shaft R is mounted, the latter also having means for operating the igniting devices, as will presently be more fully explained.

The rock-shaft P has a second crank-arm $p^2$, that projects outward over the shaft R and carries a short stud $p^3$, extended rearwardly in a plane with said shaft R, and upon which the "hit-and-miss" shiftable disk S is held to slide, the latter, in connection with the cam $r^\times$ on shaft R, serving to operate the shaft P to effect a proper shifting of the gas or gasolene feed regulating valve hereinbefore referred to and as clearly shown in Figs. 2 and 3.

T designates the centrifugal governor mechanism, which includes the vertically-disposed shaft $t$, carrying a pinion $t'$ at its lower end, held to mesh with a drive-pinion $r^2$ on the shaft R. The ball-shifted sleeve $t^3$ of the governor mechanism connects with the short arm $n$ of a bell-crank lever U, the long arm $u'$ of which has its lower end bifurcated and held to straddle the disk S. (See Figs. 2 and 3.) The exhaust-valve-controlling arm V coöperates with the cam $w$ on the front end of shaft R. Z designates the arm that operates the igniter devices, mounted on the front end of the shaft R in the usual manner.

I am aware that means in the nature of governor devices have been provided that have for their purpose to maintain the engine near a uniform speed after the current has generated to a strength desired for maintaining the lights at their maximum illuminating power.

From practical experience with governor devices heretofore employed it has been found that the varying pressure of the load frequently effects such quick and marked changes of adjustment of the said governor devices that an accurate or positive action thereof is not always to be relied on, and, furthermore, great difficulty has been experienced to provide for that delicate variation of said devices necessary to keep the generated current at such condition as to avoid flickering of and sudden changes in the illuminating power of the lamps. Again, it has been found in the use of the ordinary type of governor devices that they are inadequate for properly controlling the engine should the valve for feeding the gas or gasolene stick or otherwise fail to operate. These serious objectionable features in the ordinary type of explosive-engines of the type before referred to I positively evercome by means of supplemental governor devices especially designed to coöperate with and be controlled by the main or regular governor devices and which are also particularly designed to maintain that delicate adjustment of the engine speed required under the most adverse conditions and adapted to operate on the slightest variation of the speed from the normal—that is, the predetermined point desired for effecting the best results. The supplemental devices, which *per se* and in combination with the main governor devices form the essential features of my invention, in their detailed construction may be varied to suit the particular style of the regular or main governor mechanism with which they are intended to coöperate. When used with the style of main governor mechanism hereinbefore described, and illustrated in the accompanying drawings, they consist of a controlling device located in the igniting-circuit, in the nature of two mercury-holding cups 1 $1^a$, suitably mounted on a bracket-piece 2, formed with an outwardly-extending arm $2^a$, as best shown in Figs. 5 and 6, by reference to which it will be noticed in the outer end of the arm $2^a$ is fulcrumed a lever 3, that normally gravitates to a closing position and whose outer end terminates in a heel $3^a$, the purpose of which will presently appear. At its inner end the lever 3 has an insulated block $3^b$, in one end of which is mounted a metallic bridge-piece 4, having two pendent contact-making members $4^a$, one for each mercury-cup, in which they seat when at their normal position to close in the igniting-circuit, the terminals + and − of which join with the said mercury-cups, as clearly shown in Fig. 2.

5 designates what I term the "vibratory lever," which consists of a horizontally-disposed member adjustably clamped to the short arm $u$ of the bell-crank lever U, and the said member has its outer end extended to project in a plane vertically over the rear or heel $3^a$ of the lever 3, the connection of the lever 5 with the crank-lever U and its relation to the lever 3 being such that it is vibrated in a vertical plane by the shifting of the regular governor devices. In practice the adjustment of the lever 5 with the main governor devices is such that the same will not operate—that is, engage with the heel $3^a$ of the lever 3—so long as the speed of the engine does not exceed the maximum or predetermined point desired, and to instantly engage with said heel $3^a$ when the speed increases above said predetermined point, such operation being effected by the sudden rise of the ball-carrying sleeve of the governor, the corresponding increased rocking motion of the bell-crank lever U, connected therewith, and consequent increased sweep of the outer end of the lever 5, which in its increased movement engages the heel $3^a$ instantly and momentarily tilts the lever 3 and breaks the igniting-circuit, and thereby prevents an explosion when the engine reaches the condition stated. It will thus be manifest that by reason of my invention automatically-operated means are provided, which when the engine-load is reduced maintains a maximum acquired power for the load still on and with a reduced feed and consumption of the working agent, for the reason that in proportion to the decrease in the load the number of explosions is cut down by the action of the levers 5 and 3 and breaking of the igniting-circuit, thereby making it possible at all times to regulate the feed in proportion to the work required and yet maintain the engine-power at a point to produce the maximum current for the load still on the engine. Thus should, say, sixty lamps be in a circuit and the engine running to maintain the required maximum current and one-half or more of the lights be cut out, while the regular governor devices are adjusting themselves to provide for a proper engine equilibrium, which under ordinary circumstances at best is not accomplished instantaneously, the supplemental devices in my construction of lighting plant come into play immediately to positively cut out the number of explosions by intermittently breaking the igniting-circuit until the speed of the engine has reached that degree necessary to hold up the maximum current for the load (the lights) still on the engine.

Having thus described my invention, what I claim, and desire to secure by Letters Patent, is—

1. In an electric generating mechanism of the character stated, the combination with the igniting means including the member 2, the terminals 1 1$^a$ mounted thereon, and the lever 3 having a bridge carrying contacts to engage the terminals 1 1$^a$, said lever being pivoted near its outer end whereby to normally gravitate to bring the contacts to a closed position, the outer end of said lever terminating in a heel portion 3$^a$; of the main shaft, the centrifugal governor mechanism connected thereto and controlled by the rotation thereof, the vibratory lever U, said lever having an arm $u$, and the lever 5 detachably connected with the lever-arm $u$, and having its outer end arranged to engage the heel of member 3 when the speed of the shaft becomes excessive or beyond a predetermined point, a valve-regulating means comprising the shifting lever $u'$ rigidly connected to the vibratory lever U, and extending downward, the disk $s$ engaged by said shifting lever, the cam $r\ x$, and the valve, all being arranged so that the valve is shifted at the same time the lever $u$ engages the heel of the member 3, as set forth, substantially as shown and described.

2. In an electric-current-generating device of the character stated, a governor mechanism including the bell-crank lever U, and the electric igniting-circuit; of a pair of mercury-terminals in said circuit, a bridge-piece having contacts adapted to extend down into the mercury-terminals, a lever joined with said bridge-piece and fulcrumed to close said bridge-contacts by gravity, said lever having a heel-piece, and a switch-arm connected to the bell-crank lever U, and held to engage with the heel-piece of the contact-carrying lever, the valve mechanism and the valve-shifting lever rigidly connected to said lever U and suitably fulcrumed to swing in a vertical plane whereby the valve mechanism may be shifted simultaneously with the breaking of the igniting-circuit, all being arranged substantially as shown and for the purposes described.

LEONIDAS G. WOOLLEY.

Witnesses:
R. B. HOOVER,
WALTER H. DODD.